(12) United States Patent
Akula et al.

(10) Patent No.: US 9,497,194 B2
(45) Date of Patent: Nov. 15, 2016

(54) PROTECTION OF RESOURCES DOWNLOADED TO PORTABLE DEVICES FROM ENTERPRISE SYSTEMS

(71) Applicant: Oracle International Corporation, Redwood Shores, CA (US)

(72) Inventors: Naga Sravani Akula, Prakasam Dist (IN); Rachit Raj, Lucknow (IN); Mohamad Raja Gani Mohamad Abdul, Madurai (IN)

(73) Assignee: Oracle International Corporation, Redwood Shores, CA (US)

( * ) Notice: Subject to any disclaimer, the term of this patent is extended or adjusted under 35 U.S.C. 154(b) by 117 days.

(21) Appl. No.: 14/019,560

(22) Filed: Sep. 6, 2013

(65) Prior Publication Data

US 2015/0074813 A1    Mar. 12, 2015

(51) Int. Cl.
*G06F 21/00* (2013.01)
*H04L 29/06* (2006.01)
*H04L 29/08* (2006.01)

(52) U.S. Cl.
CPC ............ *H04L 63/10* (2013.01); *H04L 63/107* (2013.01); *H04L 63/205* (2013.01); *H04L 67/02* (2013.01); *H04L 67/10* (2013.01); *H04L 67/18* (2013.01)

(58) Field of Classification Search
CPC ............... G06F 21/57; G06F 21/58; G06F 2221/2111; G06F 21/604; G06F 21/6218; H04L 63/20; H04L 63/10; H04L 67/10; H04L 63/107; H04L 63/205; H04L 67/02; H04L 67/18
USPC ...................................... 726/1, 26
See application file for complete search history.

(56) References Cited

U.S. PATENT DOCUMENTS 6,055,637 A * 4/2000 Hudson .............. G06F 21/6218
   709/225
6,895,005 B1 * 5/2005 Malin et al. .................. 370/389

(Continued)

FOREIGN PATENT DOCUMENTS

EP           1939762 A1    7/2008
WO   WO 2008152023 A2 * 12/2008
WO   WO 2011141579 A2 * 11/2011

OTHER PUBLICATIONS

Widener, "Dynamic Differential Data Protection for High-Performance and Pervasive Applications", PhD Thesis, College of Computing, Georgia Institute of Technology, Aug. 2005, 126 pages.*

(Continued)

*Primary Examiner* — Andrew Nalven
*Assistant Examiner* — Walter Malinowski
(74) *Attorney, Agent, or Firm* — IPHorizons PLLC; Narendra Reddy Thappeta (57) ABSTRACT

Protection of resources hosted on enterprise systems. In an embodiment, an enterprise system receives a request from a portable device to download a resource, and in response formulates multiple security actions and associated conditions for the requested resource. The enterprise system sends the requested resource, the security actions and the conditions to the portable device. The portable device determines whether each condition is satisfied and performs the security actions associated with the conditions determined to have been satisfied. Due to the ability to send multiple security actions and associated conditions, better control in protection and retention of downloaded resources is obtained.

17 Claims, 5 Drawing Sheets

(56) References Cited

U.S. PATENT DOCUMENTS

| | | | | |
|---|---|---|---|---|
| 7,373,659 | B1* | 5/2008 | Vignoles et al. | 726/11 |
| 7,404,086 | B2* | 7/2008 | Sands et al. | 713/186 |
| 7,650,627 | B1* | 1/2010 | Stancheva | G06F 12/1491 380/59 |
| 8,086,651 | B2* | 12/2011 | Thomas | 707/822 |
| 8,312,168 | B2* | 11/2012 | Rhoads et al. | 709/245 |
| 8,473,961 | B2* | 6/2013 | Krsti et al. | 718/104 |
| 8,528,101 | B1* | 9/2013 | Miller | H04L 63/20 713/194 |
| 2004/0019596 | A1* | 1/2004 | Taylor et al. | 707/100 |
| 2004/0019894 | A1* | 1/2004 | Willard et al. | 719/317 |
| 2004/0068757 | A1* | 4/2004 | Heredia | 725/135 |
| 2005/0132188 | A1* | 6/2005 | Khin et al. | 713/166 |
| 2005/0182641 | A1* | 8/2005 | Ing et al. | 705/1 |
| 2005/0251852 | A1* | 11/2005 | Patrick | H04L 63/08 726/1 |
| 2005/0270560 | A1* | 12/2005 | Ferlitsch | G06F 3/1208 358/1.15 |
| 2006/0129808 | A1* | 6/2006 | Koti et al. | 713/166 |
| 2006/0177063 | A1* | 8/2006 | Conway et al. | 380/270 |
| 2007/0099698 | A1* | 5/2007 | Cole | 463/29 |
| 2007/0130589 | A1 | 6/2007 | Davis et al. | |
| 2007/0258415 | A1* | 11/2007 | Lu et al. | 370/338 |
| 2007/0298767 | A1* | 12/2007 | Brown | G06F 21/305 455/411 |
| 2008/0034401 | A1* | 2/2008 | Wang | 726/1 |
| 2008/0059474 | A1* | 3/2008 | Lim | 707/9 |
| 2008/0080396 | A1* | 4/2008 | Meijer | H04L 12/66 370/254 |
| 2008/0080552 | A1* | 4/2008 | Gates | H04L 12/66 370/468 |
| 2008/0147676 | A1* | 6/2008 | You | 707/10 |
| 2008/0155257 | A1* | 6/2008 | Werner et al. | 713/168 |
| 2008/0209505 | A1* | 8/2008 | Ghai | G06F 21/55 726/1 |
| 2009/0094193 | A1* | 4/2009 | King et al. | 707/2 |
| 2009/0165078 | A1* | 6/2009 | Samudrala et al. | 726/1 |
| 2009/0183023 | A1* | 7/2009 | Rathunde et al. | 714/4 |
| 2009/0281996 | A1* | 11/2009 | Liu et al. | 707/3 |
| 2009/0282459 | A1* | 11/2009 | Kitani | 726/1 |
| 2010/0037323 | A1* | 2/2010 | Lemieux et al. | 726/26 |
| 2010/0050244 | A1* | 2/2010 | Tarkhanyan et al. | 726/7 |
| 2010/0100972 | A1* | 4/2010 | Lemieux et al. | 726/34 |
| 2010/0205579 | A1* | 8/2010 | Zhao et al. | 717/105 |
| 2010/0223659 | A1* | 9/2010 | Ekl et al. | 726/4 |
| 2010/0268722 | A1* | 10/2010 | Yalamanchi et al. | 707/759 |
| 2012/0011560 | A1* | 1/2012 | Natarajan et al. | 726/1 |
| 2012/0096516 | A1* | 4/2012 | Sobel et al. | 726/2 |
| 2012/0255026 | A1* | 10/2012 | Baca et al. | 726/26 |
| 2012/0260303 | A1* | 10/2012 | Wollnik | G06F 21/6218 726/1 |
| 2012/0304310 | A1* | 11/2012 | Blaisdell | 726/28 |
| 2012/0311674 | A1* | 12/2012 | Hockings et al. | 726/4 |
| 2012/0324568 | A1* | 12/2012 | Wyatt et al. | 726/13 |
| 2013/0097657 | A1* | 4/2013 | Cardamore et al. | 726/1 |
| 2013/0169434 | A1* | 7/2013 | McCown | G08B 21/00 340/540 |
| 2013/0173712 | A1* | 7/2013 | Monjas Llorente | G06Q 10/00 709/204 |
| 2013/0227658 | A1* | 8/2013 | Leicher et al. | 726/5 |
| 2013/0283330 | A1* | 10/2013 | Hengeveld | 725/116 |
| 2013/0283339 | A1* | 10/2013 | Biswas et al. | 726/1 |
| 2013/0291086 | A1* | 10/2013 | Pontillo et al. | 726/10 |
| 2014/0053227 | A1* | 2/2014 | Ruppin et al. | 726/1 |
| 2014/0101136 | A1* | 4/2014 | Mizuno et al. | 707/722 |
| 2014/0115712 | A1* | 4/2014 | Powell et al. | 726/26 |
| 2014/0157354 | A1* | 6/2014 | Marshall | G06F 21/6218 726/1 |
| 2014/0279808 | A1* | 9/2014 | Strassner | 706/47 |
| 2014/0280955 | A1* | 9/2014 | Stuntebeck et al. | 709/226 |
| 2014/0331317 | A1* | 11/2014 | Singh | 726/22 |
| 2015/0242629 | A1* | 8/2015 | Lindo | G06F 21/53 726/1 |

OTHER PUBLICATIONS

Absolute Manage MDM / Features & Benefits, http://www.absolute.com/en/products/absolute-manage-mdm/features, downloaded circa Jun. 11, 2013, pp. 1-4.

APPTIX Mobile device Manager, http://www.apptix.com/support/mobile/mobile-device-manager-(mdm)/mdm_android_userguide_apptix_08mar2013.aspx, Date: Mar. 8, 2013, pp. 1-28.

BlackBerry® Curve™ 3G 9300 (5.0.0.606), http://support.bell.ca/Mobility/Smartphones_and_mobile_internet/BlackBerry_Curve_3G.how_to_set_automatic_deletion_of_old_messages_on_1, downloaded circa Apr. 2, 2013, pp. 1-1.

bsavvy with RM infrastructure, http://www.rm.com/home/aboutus/media/86169/Infrastrucutre%20BYOD%20wireless%20WP.pdf, date 2012, pp. 1-12.

Junos Pulse Mobile Security Suite, http://www.juniper.net/us/en/local/pdf/datasheets/1000328-en.pdf , date Jan. 2013, pp. 1-12.

Mce content management solution, http://www.mce-sys.com/Site/Products/mce100/mce100.html, downloaded circa Apr. 2, 2013, pp. 1-1.

Mobile Device Application Risks, http://www.cloudcentrics.com/?cat=28, downloaded circa Apr. 2, 2013, pp. 1-3.

SearchYourCloud provides single search capability, http://cloudcomputing-365.info/news_full.php?id=26631, downloaded circa Apr. 2, 2013, pp. 1-3.

The Dark Side of BOYD, http://consumerization.trendmicro.com/consumerization-byod-privacy-personal-data-loss-and-device-seizure/, downloaded circa Apr. 2, 2013, pp. 1-6.

The signal solution, http://www.signalvp.com/signal/, downloaded circa Apr. 2, 2013, pp. 1-1.

Trend micro Mobile Security, http://docs.trendmicro.com/all/ent/tmms-ee/v5.5/en-us/tmms-ee_5.5_ag.pdf, date Feb. 2010, pp. 1-93.

Your Documents May Be Hiding Hidden Data, http://www.businessnewsdaily.com/2716-metadata-harmful-potential-business-emails.html, downloaded circa Apr. 2, 2013, pp. 1-6.

* cited by examiner

| | Resource | Rule | OnFail |
|---|---|---|---|
| 441 → | All | Authentication | Reauthenticate |
| 442 → | All | PasswordAttempts<5 | Lock |
| 443 → | All Downloaded | Authentication; PasswordAttempts<5 | Delete |
| 444 → | All Downloaded | AccessRights:=Read Only; AllowCopy:=False | - |
| 445 → | All Downloaded | Retention :=2 days | Delete |
| 446 → | Sales | Role = Sales OR Support | Deny Access |
| 447 → | Sales Downloaded | AccessTime IN [09:00 IST, 19:00 IST] | Deny Access |
| 448 → | Sales Downloaded | Location = Office | Reauthenticate |
| 449 → | Sales Downloaded | Network = Local | Deny Access |
| 450 → | Testing | Role = Tester | Deny Access |

```
471: {
472:   "resource:useraccessrights":"read-only",
473:   "resource:allowcopy": "false",
474:   "resource:duration": "2days",
475:   "resource:durationexceed": "action:delete",
476:   "emp_role":"sales_or_support",
477:   "timebasedaccess": "true",
478:   "timebasedaccess:time": "0900:1900",
479:   "timebasedaccess:timezone": "IST",
480:   "on_event":"geolocchange_or_networkchange_or_exceedpwdretry",
481:   "geolocchange:geofencing":"33.34la:77.2lo-36.6la:78.45lo",
482:   "action:geolocchange":"reauthenticate",
483:   "action:networkchange":"denyaccess",
484:   "action:exceedpwdretry":"delete",
       "maximumpwdattempts": "5"
     }
```

PROTECTION OF RESOURCES DOWNLOADED TO PORTABLE DEVICES FROM ENTERPRISE SYSTEMS

BACKGROUND OF THE DISCLOSURE

1. Technical Field

The present disclosure relates to enterprise systems and more specifically to protection of resources downloaded to portable devices from enterprise systems.

2. Related Art

Portable devices refer to devices such as mobile phones, tablets, notebook computers, etc., which are easy to carry around to different locations. Such portable devices are characterized by relatively smaller size, low weight, and wireless communication facilities, to support the desired portability.

Resources are often downloaded to portable devices, for example, from various enterprise systems hosting the resources. The resources are in the form of digital data in corresponding files, and can represent content or applications. The resources are hosted by organizations and made available to different users such as employees of the organization. Downloading resources facilitates users to, for example, use the resource when the portable devices are not connected to the servers.

Protection of resources is often desirable in various environments. Protection implies controlling user access to the resource. Such control can entail any of authenticating the user, authorization (whether the user is permitted to perform corresponding actions) of the authenticated user for a corresponding resource, access control (e.g., based on frequency, time of day, etc.), and retention (i.e., how long to keep and/or when to delete the resource). Features of the present disclosure provide at least some aspects of such protection for resources.

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present invention provides for protection of resources hosted on enterprise systems. In an embodiment, an enterprise system receives a request from a portable device to download a resource, and in response formulates multiple security actions and associated conditions for the requested resource. The enterprise system then sends the requested resource, the security actions and the conditions to the portable device. The portable device determines whether each condition is satisfied and performs the security actions associated with the conditions determined to have been satisfied.

Due to the ability to send multiple security actions and associated conditions, better control in protection of downloaded resources is obtained.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
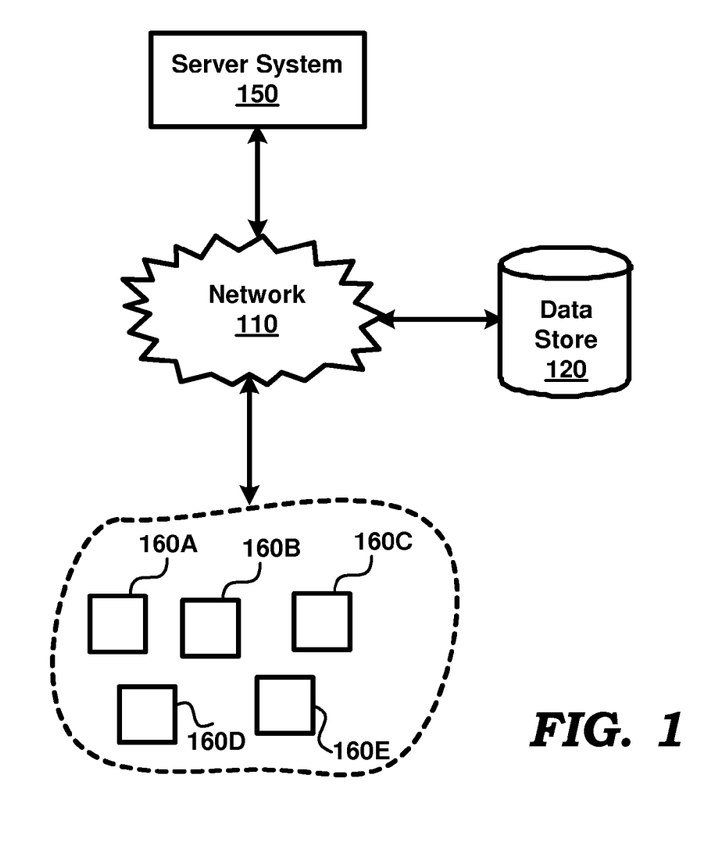
FIG. 1 is a block diagram illustrating an example computing system in which several aspects of the present disclosure can be implemented.

FIG. 1 is a block diagram illustrating an example computing system in which several aspects of the present disclosure can be implemented. The block diagram is shown containing network 110, data store 120, server system 150, and portable devices 160A-160E. Merely for illustration, only representative number/type of systems is shown in the Figure. Many environments often contain many more systems, both in number and type, depending on the purpose for which the environment is designed. Each system/device of FIG. 1 is described below in further detail.

Broadly, FIG. 1 depicts a Bring Your Own Device (BYOD) type environment where users/employees of an organization/enterprise bring portable devices (such as 160A-160E) to the premises of the organization and then use the devices to connect to various enterprise systems (such as server system 150). After connecting to the desired enterprise systems, the users may use or access resources hosted on the enterprise systems, as is well known in the relevant arts.

Network 110 provides connectivity between portable devices 160A-160E and various enterprise systems (such as server system 150), and may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

A (IP) packet is said to be directed to a destination system when the destination IP address of the packet is set to the (IP) address of the destination system, such that the packet is eventually delivered to the destination system by network 110. When the packet contains content such as port numbers, which specifies the destination application, the packet may be said to be directed to such application as well. The destination system may be required to keep the corresponding port numbers available/open, and process the packets with the corresponding destination ports. Network 110 may be implemented using any combination of wire-based or wireless mediums.

Data store 120 represents a non-volatile (persistent) storage facilitating storage and retrieval of data by applications executing in server system 150. Data store 120 may store the details of the resources hosted on server system 150, portions/data corresponding to one or more hosted resources, and the policies based on which the hosted resources are to be provided access to various users, etc. Data store 120 may be implemented as a corresponding database server using relational database technologies and accordingly provide storage and retrieval of data using structured queries such as SQL (Structured Query Language). Alternatively, data store 120 may be implemented as a corresponding file server providing storage and retrieval of data in the form of files organized as one or more directories, as is well known in the relevant arts.

Each of portable devices 160A-160E represents a system such as a laptop, mobile device, tablet, smart phone, etc., used to access various resources (such as data and/or applications) provided within or external to the computing system of FIG. 1. The resources may be accessed based on access requests generated by applications executing in the portable device (in response to a user interaction). In response to sending the access requests, the portable device receives the corresponding resources (or other suitable responses), as implemented in the corresponding environment. The responses (e.g., data) may then be presented to the user by the applications in the requesting portable device.

Server system 150 represents a server, such as a web/application server, capable of hosting resources and thereafter providing access to the hosted resources to users (using portable devices 160A-160E). In general, each server system receives access requests identifying (for example, by a Uniform Resource Locator (URL)) the desired resources and in response sends/provides access of the resources to the requesting user. Each server system may use data stored internally (for example, in a non-volatile storage/hard disk within the system), external data (for example, stored in data stores such as 120) and/or data received from external sources (e.g., from the user) in processing of the user requests.

It may be appreciated that the resources hosted on enterprise systems (such as server system 150) are often sought to be protected by organizations/enterprises, with objectives such as ensuring only authorized uses/users are permitted further use of the resources. In a BYOD scenario, such protection typically implies controlling the user access to the resources by using techniques such as authentication, authorization, access control, retention, etc. as is well known in the relevant arts.

In one embodiment, administrators of the resources specify various policies (maintained in data store 120 or server system 150) according to which users are to be provided access to the hosted resources. Each policy specifies for a resource (or a group of related resources), a corresponding set of rules (for example, based on the role of the user, the authentication to be performed, the time of the day, the frequency, the place of access, etc.) that need to be satisfied before a user is provided access to the resource.

Thus, in response to an access request for a resource, server system 150 first identifies the specific policies (in data store 120) that are applicable for a combination of two or more of the requested resource, the user, the application accessing the resource and the type of portable device from which the resource is being accessed. Server system 150 then determines whether the requesting user is to be provided access to the resource based on the rules specified in the identified policies, data provided by the user (e.g., authentication information), data related to the application/device and other external data (e.g., the current time, place of access, etc.). The user is provided access to the resource (that is, the access request is successful) only if the rules are determined to be satisfied.

It should be noted that in a scenario that the enterprise contains multiple enterprise systems (similar to server system 150), each of the enterprise system may be enabled to apply policies similar to server system 150. In an alternative embodiment, the enterprise contains a common policy server to which all access requests originating from portable devices 160A-160E are redirected (for example, by configuration of network 110). The policy server may then forward the successful access requests to the appropriate enterprise systems.

It may be appreciated that above noted protection of resources is performed only when the resources are accessed by sending requests to the systems in the enterprise. However, in the BYOD scenario noted above, it may also be desirable that the users be allowed to download the resources to their portable/personal devices, for later usage. For example, a sales person (of the organization) who is visiting a customer's location for discussion on a potential deal may require confidential/sensitive information such as the customer's requirements, deployment details, existing software/hardware stack, the previous deals with the organization, etc. The sales person may accordingly wish to download the sensitive information, in the form of corresponding files/resources, to his/her portable device prior to visiting the customer.

However, it may also be desirable that the confidential information be not permitted access in the user's portable device after the intended purpose of downloading is served. In one approach, the user is required to manually remove the confidential information from his/her portable device after the purpose is served. Such manual approaches to removal may be unreliable and thus undesirable. In an alternative approach, the organization may send a remote wipe command to the portable device causing all the data (including the personal data of the user) on the portable device to be removed. However removal of such personal data may not be desirable.

Server system 150, extended according to the present disclosure, facilitates the protection of resource downloaded to portable devices from enterprise systems, while overcoming at least some of the drawbacks of the approaches noted above. Though the protection related features of the present disclosure are described with respect to server system 150, it should be appreciated that the features may be implemented in other enterprise/server systems, in a common policy server or in an independent system/server depending on requirements of the environment. The manner in which server system 150 may facilitate the protection of downloaded resources is described below with examples.

3. Protection of Resources Downloaded to Portable Devices

Figure 2:
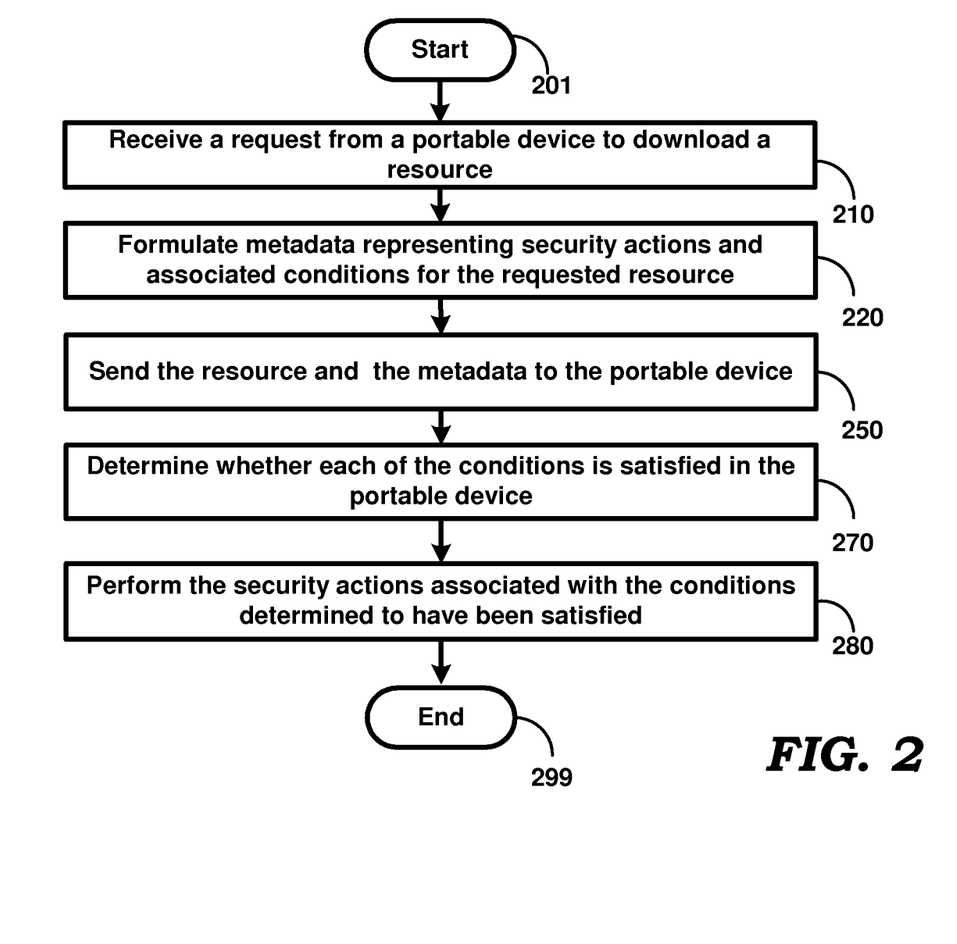
FIG. 2 is a flow chart illustrating the manner in which protection of resources downloaded to portable devices from enterprise systems is facilitated in one embodiment.

FIG. 2 is a flow chart illustrating the manner in which protection of resources downloaded to portable devices from enterprise systems is facilitated in one embodiment. The flowchart is described with respect to the systems of FIG. 1, in particular, server system 150, merely for illustration. However, the features can be implemented in other systems and environments also without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, server system 150 receives a request from a portable device (such as 160A-160E) for downloading a hosted resource. It is assumed that any necessary authentication (e.g., by providing a user name and password) is already performed for the user prior to receiving of the download request for the resource.

In step 220, server system 150 formulates metadata representing security actions and associated conditions for the requested resource. The formulation may entail identifying the specific policies (in data store 120) that are to be implemented for the requested resource, and then generating the specific security actions and associated conditions based on the (rules specified in) identified policies. In a scenario that the policies are maintained by a policy server, server system 150 may first retrieve the specific policies by communicating with the policy server.

In step 250, server system 150 sends the requested resource and the metadata to the requesting portable device (assumed to be 160A). The resource and metadata may be sent together as a response to the download request to the requesting portable device. Alternatively, server system 150 may include in the response along with the metadata, a download URL using which the portable device can download the requested resource. Server system 150 may thereafter send the resource, in response to the portable device connecting with the download URL (for example, when the user accesses the resource for the first time in the portable device).

The resource and metadata may then be stored, for example, in a non-volatile memory on the portable device. The user may thereafter access (one or more times) the downloaded resource stored on the portable device. An aspect of the present disclosure facilitates protection of the downloaded resources stored on the portable device, as described in detail below.

In step 270, the requesting portable device (160A) determines whether each of the conditions is satisfied in the portable device. The determination may be performed when the user accesses the downloaded resource stored on the portable device. Alternatively, the status of each of the conditions may be actively monitored (e.g., periodically) by the portable device until one or more conditions are determined to be satisfied.

In step 280, the portable device (160A) performs the security actions associated with the conditions determined to have been satisfied. The security actions may entail actions such as removing the resource from the non-volatile memory on the portable device, requiring the user to re-authenticate before accessing the downloaded resource, providing the resource in read-only mode (wherein the user is unable to modify the resource), etc. The flow chart ends in step 299.

Thus, by providing the ability to specify multiple conditions and associated security actions, a flexible and comprehensive approach to protection of downloaded resources is provided (even after the initial intended purpose of downloading is served). Furthermore, only the data specific to each downloaded resource is removed without affecting the personal data of the user stored on the portable device. The description is continued illustrating the manner in which the steps of FIG. 2 may be implemented in one embodiment.

4. Example Implementation

Figure 3:
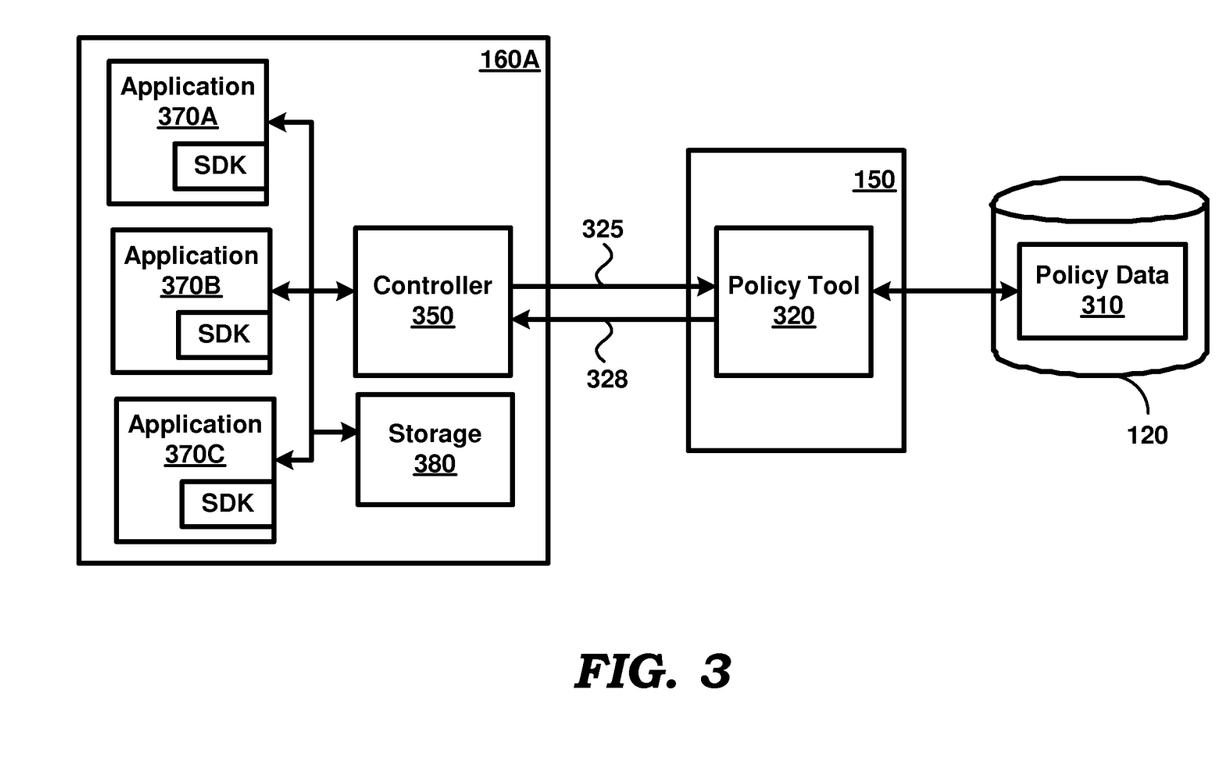
FIG. 3 is a block diagram illustrating the manner in which the protection of resources downloaded to portable devices from enterprise systems is implemented in one embodiment.

FIG. 3 is a block diagram illustrating the manner in which the protection of resources downloaded to portable devices from enterprise systems is implemented in one embodiment. The block diagram is shown containing policy data 310, policy tool 320, controller 350 and applications 370A-370C. Each of the blocks is described in detail below.

Policy data 310 (shown within data store 120) specifies the various policies of the organization, as configured by the administrators of the organization. In general, a policy specifies when a particular rule is to be applied for a user-resource combination. On the other hand, a rule contains general conditions applicable type/group of resources/users, which are translated (if needed) into specific conditions applicable for each user-resource combination. The manner in which policy data 310 may be implemented in one embodiment is described in detail below.

Figure 4A:
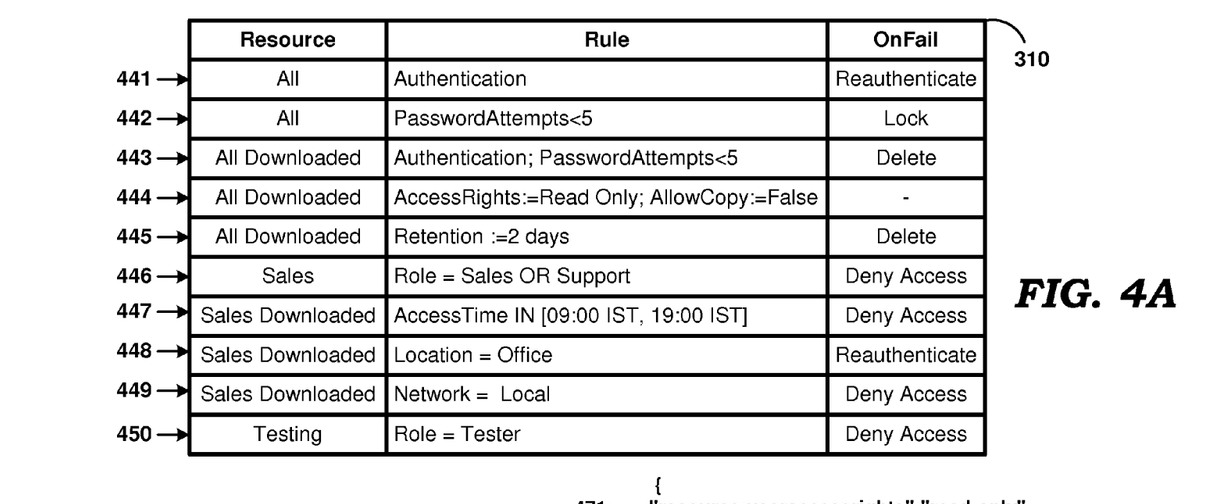
FIG. 4A illustrates the manner in which policy data is maintained in one embodiment.

FIG. 4A illustrates the manner in which policy data is maintained in one embodiment. For illustration, it is assumed that data store 120 is implemented as a database server using relational database technologies and accordingly policy data 310 is maintained in the form of a table (in a database) in the database server. However, in alternative embodiments, the policy data may be maintained in any other format such as XML (Extensible Markup Language), as will be apparent to one skilled in the relevant arts by reading the disclosure herein.

As noted above, the policies of the organization contain one or more rules that need to be checked in permitting access to corresponding resource (or a group of resources). Accordingly, in table 310, column "Resource" specifies the resource type (or a group of resources) for which the corresponding policy is to be applied, column "Rule" specifies the details of the corresponding general rule and column "OnFail" specifies the action to be performed when the corresponding rule is not satisfied (in other words, on failure of the corresponding rule).

Each of rows 441-450 specifies the details of a corresponding policy. For example, row 446 indicates that all resources of the group "Sales" are allowed access to users having the Role as either "Sales" or "Support", and a user of any other Role (that is on fail of the rule) is to be denied access to the resources of the group "Sales". Similarly, the other rows specify corresponding policies to be implemented by server system 150. It may be observed that the policies in rows 441-442, 446 and 450 are applicable when resources are accessed by the user, while the policies in rows 443-445 and 447-449 are applicable only when the resources are downloaded by the users.

Thus, policy data 310 specifying the various access and/or download policies of the organization is maintained in data store 120. The manner in which (download) requests for resources are processed and corresponding metadata formulated based on policy data 310 is described below with examples.

5. Formulating Metadata

Referring again to FIG. 3, policy tool 320 represents an application (executing in server system 150), which processes (download) requests received from users using portable devices 160A-160E. For illustration, it is assumed that policy tool 320 receives a download request (325) for a resource of the "Sales" group from a user using portable device 160A. As noted above, it is further assumed the requests (such as 325) are received after successful authentication of the user. The manner in which policy tool 320 processes such a download request (325) is described in detail below.

In response to the download request (325), policy tool 320 first identifies that the policies specified in rows 443-445 and 447-449 are to be applied for the requested download of the resource of the "Sales" group. Policy tool 320 then generates the metadata containing security actions and associated conditions based on the identified rules/rows. For example, in response to row 443, policy tool 320 may add to the metadata, the security action "delete" in association with the condition "exceedpwdretry" (that is, exceed password retry). In general, the general condition in the rule of each policy is translated to the specific condition by incorporating additional detail for the specific user-resource combination, in formulating the metadata. A sample metadata that may be generated by policy tool 320 corresponding to the policies specified in rows 443-445 and 447 and 449 is described in detail below.

Figure 4B:
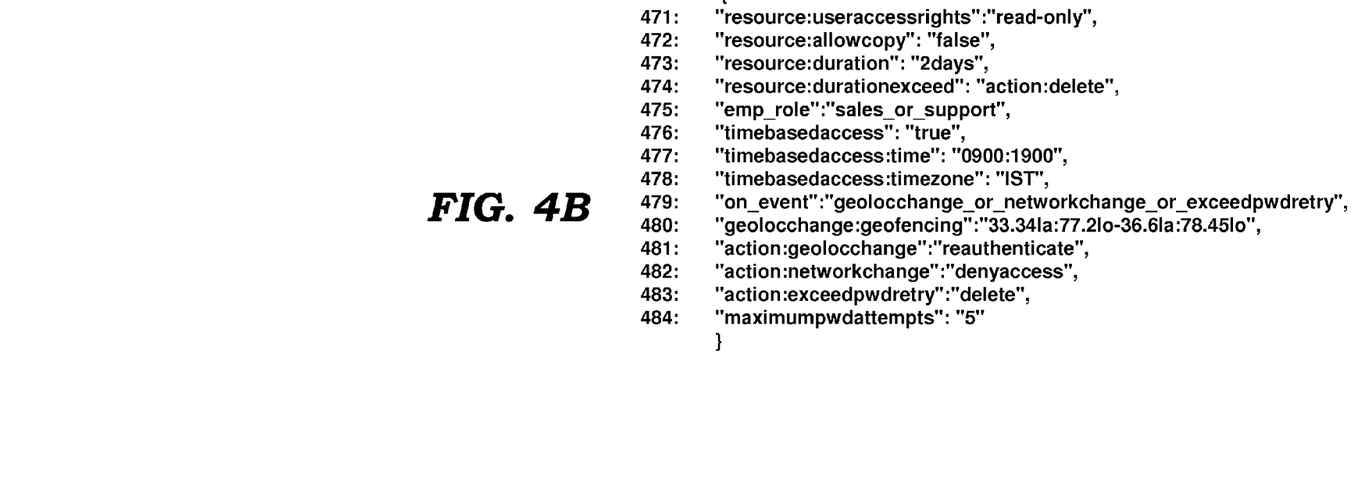
FIG. 4B illustrates the manner in which metadata is formulated in one embodiment.

FIG. 4B illustrates the manner in which metadata is formulated in one embodiment. For illustration, the metadata is shown formulated according to JSON (JavaScript Object Notation) format, which is described in detail in RFC 4627 entitled, "The application/json Media Type for JavaScript Object Notation (JSON)". However, in alternative embodiments, the metadata may be according to any other format such as XML (Extensible Markup Language), as will be apparent to one skilled in the relevant arts by reading the disclosure herein.

Each of lines 471-484 specifies security actions and associated specific conditions to be checked for the requested resource after downloading to portable device 160A of the user. In general, each line is of the form "condition":"security action", where the security action is to be performed upon the corresponding condition being satisfied. Thus, line 474 indicates that the delete security action ("action:delete") is to be performed when the downloaded resource has exceeded the duration specified in the metadata ("resource:durationexceed"). The specific duration is specified in line 473 as 2 days ("resource:duration": "2 days") in the metadata, thereby indicating that the downloaded data is to be deleted upon expiry of 2 days on the portable device.

The other lines in metadata of FIG. 4B specify the other security actions and associated specific conditions for the requested resource. In particular, line 480 specifies the geographical coordinates of the location type "Office" corresponding to the requesting user, while line 481 specifies the corresponding security action of requiring re-authentication of the user if the user is outside of the geographical coordinates. It may be appreciated that line 480 is a specific condition generated by translating the general condition in row 448, which specifies a location type "Office" of the user where the user is allowed access to the resource.

Similarly, lines 471-472, 473-474, 475, 476-478 are generated respectively based on the translation of the rules specified in the rows 444, 445, 446, and 447, while lines 479-484 are generated based on the rules specified in the rows 443 and 448-449. It may be observed that the conditions in the metadata are based on the time of download (for finding the duration of the resource on the portable device), the time of accessing the resource, the role of the user, the geographical location of the user, the specific network to which the user's portable device (160A) is connected, etc.

Thus, policy tool 320 formulates the metadata specifying the security actions and associated conditions for the requested resource. Policy tool 320 then sends the metadata of FIG. 4B as a response (328) to the download request. As noted above, response 328 may also include the requested resource or a URL from which the requested resource can be downloaded by portable device 160A. The manner in which portable device 160A protects the downloaded resources based on the metadata is described below with examples.

6. Protecting Downloaded Resources in a Portable Device

Referring again to FIG. 3, each of applications 370A-370C (executing in portable device 160A) represents a corresponding user application providing various functionalities to the user using the portable device (160A). Each user application may accordingly provide various user interfaces to the user. In response to user interactions using the provided user interfaces, applications 370A-370C may send requests for downloading resources from the enterprise systems (such as 150) of the organization.

For example, application 370B may represent a sales application that enables a sales person of the organization to prepare presentations for a customer (of the organization). Accordingly, the sales person may wish to download a customer requirements document to be included in the presentation prior to visiting the customer at the customer's location. In response to the sales person indicating the download of the customer requirements document, application 370B sends a download request for the document/resource to the specific server system hosting the resource.

In one embodiment, each of applications 370A-370C is required to access/download resources hosted on the enterprise systems through controller 350 executing in portable device 160A. Such a requirement may be enforced by including a software development kit (SDK) during the compilation of applications 370A-370C. The SDK may include various procedures that need to be invoked for accessing and/or downloading resources from the enterprise systems. Upon invocation of the procedures, the SDK is designed to route all the access/download requests to controller 350. Thus, in the above noted scenario, application 370B invokes the procedures in the SDK for downloading the customer requirements document, with the SDK in turn routing the download request to controller 350.

Though the SDK is shown as a part of each of applications 370A-370C, it should be appreciated that in alternative embodiments, the requirement that all requests be routed through controller 350 may be implemented in any convenient manner consistent with the environment of the portable devices. For example, in a scenario that applications 370A-370C are applications that execute in the context of a virtual machine (such as Java[™] Virtual Machine), the SDK may be provide only as part of the virtual machine to ensure that all requests are routed through controller 350.

Controller 350 (executing in portable device 160A), in response to an access or download request, forwards the request to policy tool 320. Upon receiving the corresponding response containing the requested resource and metadata, controller 350 stores the received resource and metadata in storage 380 (a non-volatile memory contained in portable device 160A). Thus, in response to receiving the download request for the customer requirements document, controller 350 forwards the request to policy tool 320, receives the document and the metadata of FIG. 4B (since the document is a resource of the "Sales" group) and then stores the received document and metadata in storage 380.

As noted above, in an alternative embodiment, the response sent by policy tool 320 may contain only the metadata and a download URL for the document/resource. Controller 350 may accordingly store the metadata and the download URL in storage 380. In response to receiving a request (from applications 370A-370C) to access the downloaded document, controller 350 connects to the download URL, receives the document/resource, stores the document in storage 380 and then provides access to the document to the requesting application.

In one embodiment, storage 380 facilitates storage and retrieval of data in the form of files organized as one or more directories. In particular, each of applications 370A-370C is associated with a corresponding directory that is accessible only to the application. Accordingly, controller 350 forwards the downloaded document/resource to the requesting application, which then stores the resource in the corresponding directory. Thus, each downloaded resource is accessible only to the requesting application after downloading and storing the resource in storage 380.

It may be appreciated that when the policies applicable to a resource are modified (for example, by administrators), server system 150 may formulate a new metadata and send to portable devices 160A-160E that have downloaded the resource. Alternatively, controller 350 in each portable device may be enabled to periodically check whether the policies on the downloaded resources have changed, and in response to determining such a change, download again the new metadata (and if required the resource) to the portable device.

Controller 350 then actively monitors the conditions (such as duration, location, etc.) specified in the received metadata to determine whether any of the conditions is satisfied. Controller 350 also performs the determination of the conditions satisfied (such as the conditions related to role, time of access, network connection, etc.) in response to user accessing the downloaded resources (using applications 370A-370C) or periodically/asynchronous to such requests. Though not shown, it may be appreciated that controller 350 may interface with various other hardware components (e.g., GPS receivers) and/or software components (e.g., operating system) of portable device 160A to determine the specific conditions satisfied.

In a scenario that specific conditions are determined to be satisfied, controller 350 perform the associated security actions (such as deleting the downloaded resource, denying access to the downloaded resource, etc.) as specified in the metadata. In one embodiment in which each application controls access/create/removal of resources in the corresponding directory, controller 350 sends the security action (such as delete) to the SDK of the corresponding application (370A-370C), with the SDK then performing the security actions (including removal of the resource/file) in the corresponding directory. Thus, controller 350 in combination with policy tool 320 facilitates the protection of the resources downloaded to portable devices from enterprise systems.

It should be appreciated that the features described above can be implemented in various embodiments as a desired combination of one or more of hardware, executable modules, and firmware. The description is continued with respect to an embodiment in which various features are operative when executable modules are executed.

7. Digital Processing System

Figure 5:
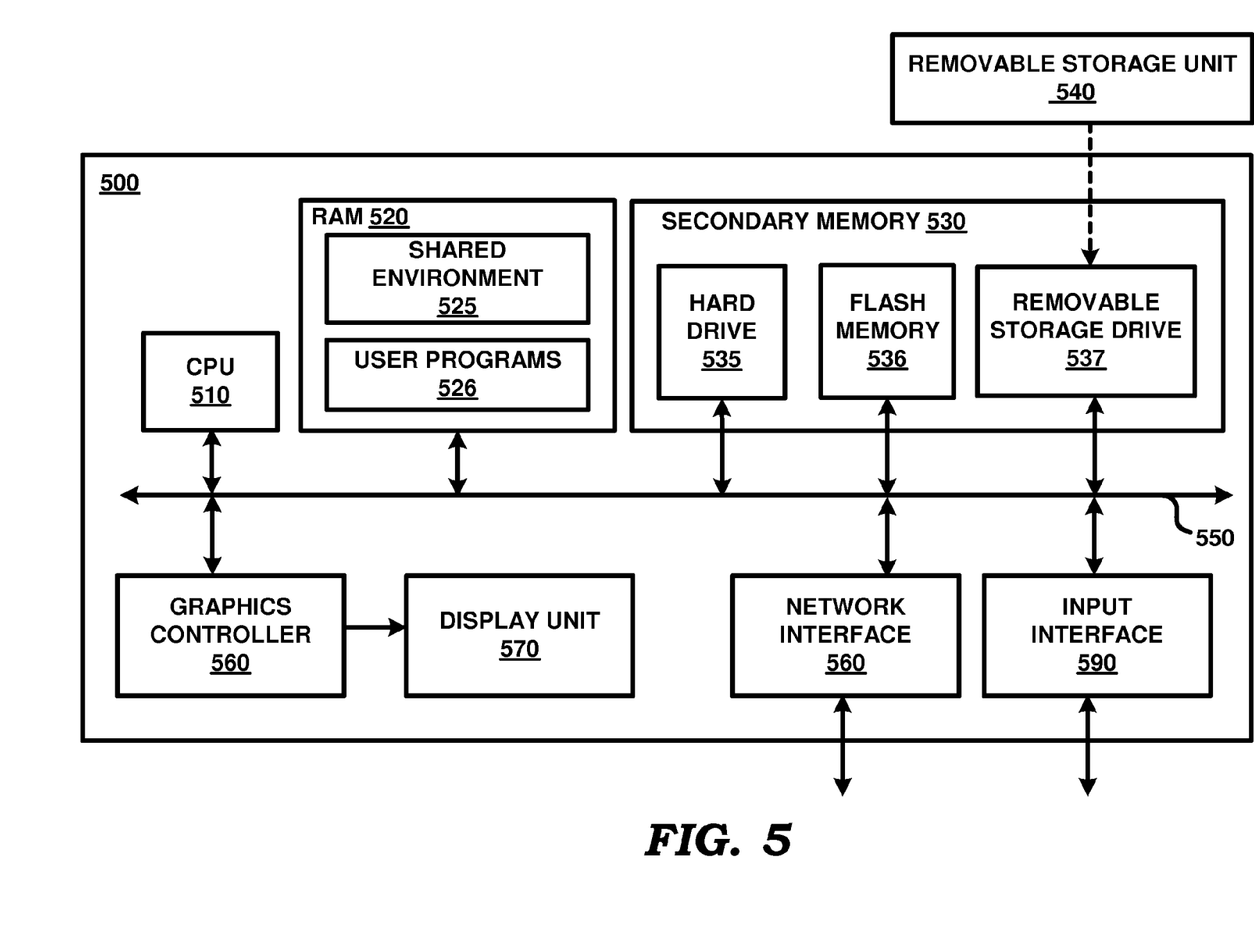
FIG. 5 is a block diagram illustrating the details of a digital processing system in which various aspects of the present disclosure are operative by execution of appropriate executable modules.

FIG. 5 is a block diagram illustrating the details of digital processing system 500 in which various aspects of the present disclosure are operative by execution of appropriate executable modules. Digital processing system 500 may correspond to one of server system 150 and portable devices 160A-160D.

Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present disclosure. CPU 510 may contain multiple processing units, with each processing unit potentially being designed for a specific task. Alternatively, CPU 510 may contain only a single general-purpose processing unit.

RAM 520 may receive instructions from secondary memory 530 using communication path 550. RAM 520 is shown currently containing software instructions constituting operating environment 525 and/or other user programs 526 (such as applications 370A-370C, etc.). In addition to operating environment 525, RAM 520 may contain other software programs such as device drivers, virtual machines, etc., which provide a (common) run time environment for execution of other/user programs.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse) and may be used to provide inputs. Network interface 580 provides connectivity to a network (e.g., using Internet Protocol), and may be used to communicate with other systems connected to the network of FIG. 1.

Secondary memory 530 may contain hard drive 535, flash memory 536, and removable storage drive 537. Secondary memory 530 may store the data (for example, portions of the data shown in FIGS. 4A and 4B) and software instructions (for implementing the steps of FIG. 2), which enable digital processing system 500 to provide several features in accordance with the present disclosure. The code/instructions stored in secondary memory 530 may either be copied to RAM 520 prior to execution by CPU 510 for higher execution speeds, or may be directly executed by CPU 510.

Secondary memory 530 may contain hard drive 535, flash memory 536, and removable storage drive 537. Some or all of the data and instructions may be provided on removable storage unit 540, and the data and instructions may be read and provided by removable storage drive 537 to CPU 510. Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 530. Volatile media includes dynamic memory, such as RAM 520. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 550. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

8. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of protecting resources hosted on enterprise systems, said method being performed at least in part by an enterprise system, said method comprising:

maintaining security policies applicable to said resources;

receiving a request from a portable device to download a resource of said resources, wherein said resource is a data file for use by an application executing in said portable device;

formulating a plurality of security actions and a plurality of conditions applicable for said data file, wherein each security action is associated with a corresponding condition of said plurality of conditions, wherein a first condition specifies a retention duration and an associated first security action indicates a delete action, wherein said formulating comprises:

identifying a set of security policies of said security policies applicable to a combination of two or more of said resources, a user at said portable device, said application accessing said data file and a type of said portable device, wherein each of said set of security policies comprises a general condition; and translating each of said general conditions to corresponding specific conditions as applicable to said combination, wherein said specific conditions are included in said plurality of conditions;

sending to said portable device, said data file along with said plurality of security actions and said plurality of conditions, including said first security action and said first condition, as a response to said request;

determining whether each of said plurality of conditions is satisfied in said portable device, wherein said determining determines at a first time instance that the duration of said data file on said portable device has exceeded said retention duration; and performing on said data file, the security action associated with a condition determined to have been satisfied, wherein said performing performs said delete action by deleting said data file on said portable device after said first time instance, wherein said data file is available on said portable device only for said retention duration, thereby protecting said data file downloaded to said portable device.

2. The method of claim 1, wherein said formulating represents said plurality of security actions and said plurality of conditions in the form of a metadata, wherein said sending sends said metadata along with said data file as a part of said response.

3. The method of claim 2, wherein a first general condition specifies a location type of said user, wherein said translating includes geographical coordinates of said location type corresponding to said user in a corresponding first specific condition, such that a first associated security action is performed when said user is located in a geographical area determined by said geographical coordinates.

4. The method of claim 3, wherein said first associated security action comprises requiring re-authentication of said user if said user is outside of said geographical area.

5. The method of claim 2, wherein said determining and said performing are performed by said portable device, and wherein said receiving, said formulating and said sending are performed by said enterprise system.

6. The method of claim 1, wherein said data file is stored in said portable device upon being received in said portable device, wherein said data file contains content accessed by said application executing in said portable device, wherein said content of said data file is sought to be protected after being downloaded to said portable device.

7. A computing system comprising:
a portable device to enable users to download resources; and
an enterprise system to host said resources, said enterprise system operable to:
maintain security policies applicable to said resources;
receive a request from said portable device to download a resource of said resources, wherein said resource is a data file for use by an application executing in said portable device;
formulate a plurality of security actions and a plurality of conditions applicable for said data file, wherein each security action is associated with a corresponding condition of said plurality of conditions, wherein a first condition specifies a retention duration and an associated first security action indicates a delete action, wherein to formulate said metadata, said enterprise system is operable to:
identify a set of security policies of said security policies applicable to a combination of two or more of said resources, a user at said portable device, said application accessing said data file and a type of said portable device, wherein each of said set of security policies comprises a general condition; and
translate each of said general conditions to corresponding specific conditions as applicable to said combination,
wherein said specific conditions are included in said plurality of conditions; and
send to said portable device, said data file along with said plurality of security actions and said plurality of conditions, including said first security action and said first condition, as a response to said request,
wherein said portable device is operable to:
receive said response containing said data file along with said plurality of security actions and said plurality of conditions including said first security action and said first condition;
determine whether each of said plurality of conditions is satisfied in said portable device, wherein said portable device determines at a first time instance that the duration of said data file on said portable device has exceeded said retention duration; and
perform on said data file the security action associated with a condition determined to have been satisfied, wherein said portable device performs said delete action by deleting said data file on said portable device after said first time instance,
wherein said data file is available on said portable device only for said retention duration, thereby protecting said data file downloaded to said portable device.

8. The computing system of claim 7, wherein said enterprise system represents said plurality of security actions and said plurality of conditions in the form of a metadata, wherein said enterprise systems sends said metadata along with said data file as a part of said response and said portable device receives said metadata along with said data file.

9. The computing system of claim 8, wherein a first general condition specifies a location type of said user, wherein said translating includes geographical coordinates of said location type corresponding to said user in a corresponding first specific condition, such that a first associated security action is performed when said user is located in a geographical area determined by said geographical coordinates.

10. The computing system of claim 9, wherein said first associated security action comprises requiring re-authentication of said user if said user is outside of said geographical area.

11. The computing system of claim 8, wherein said portable device is further operable to:
store in a memory, said data file and said metadata after receiving from said enterprise system;
receive an access request from a user for said data file; and
provide said data file stored in said memory as a response to said access request,
wherein said portable device determines whether each of said plurality of conditions is satisfied in said portable device, before said portable device provides said data file stored in said memory as said response to said access request.

12. The computing system of claim 7, wherein said request is received from an application of a plurality of applications executing in said portable device.

13. A non-transitory machine readable medium storing one or more sequences of instructions for causing a portable device to provide protection of resources downloaded from enterprise systems, wherein execution of said one or more sequences of instructions by one or more processors contained in said portable device causes said portable device to perform the actions of:
receiving from a user, a request to download a resource of said resources, wherein said resource is a data file for use by an application executing in said portable device;
downloading from an enterprise system hosting said data file, both of said data file and a metadata together in response to said request, said metadata specifying a plurality of security actions and a plurality of conditions applicable for said data file, wherein each security action is associated with a corresponding condition of said plurality of conditions, wherein a first condition specifies a retention duration and an associated first security action indicates a delete action,
wherein said plurality of conditions and said plurality of security actions are generated based on a set of security policies applicable to a combination of two or more of said resources, a user at said portable device, said application accessing said data file and a type of said portable device, wherein each of said set of security policies comprises a general condition,
wherein said plurality of conditions includes specific conditions corresponding to said general conditions as applicable to said combination;
determining whether each of said plurality of conditions is satisfied in said portable device, wherein said determining determines at a first time instance that the duration of said data file on said portable device has exceeded said retention duration; and
performing on said data file, the security action associated with a condition determined to have been satisfied prior to permitting access to said data file, wherein said performing performs said delete action by deleting said data file on said portable device after said first time instance,
wherein said data file is available on said portable device only for said retention duration, thereby protecting said data file downloaded to said portable device.

14. The machine readable medium of claim 13, further comprising one or more instructions for:
storing in a memory, said data file and said metadata after said receiving from said enterprise system;

receiving from said user, an access request for said data file; and providing said data file stored in said memory as a response to said access request, wherein said determining and said performing is performed before said providing provides said data file stored in said memory as said response to said access request.

15. The machine readable medium of claim 14, wherein said access request is received from said user interacting with an application of a plurality of applications executing in said portable device.

16. The machine readable medium of claim 13, wherein a first general condition specifies a location type of said user, wherein a corresponding first specific condition includes geographical coordinates of said location type corresponding to said user, such that a first associated security action is performed when said user is located in a geographical area determined by said geographical coordinates.

17. The machine readable medium of claim 16, wherein said first associated security action comprises requiring re-authentication of said user if said user is outside of said geographical area.

* * * * *

UNITED STATES PATENT AND TRADEMARK OFFICE
CERTIFICATE OF CORRECTION

PATENT NO.         : 9,497,194 B2
APPLICATION NO.    : 14/019560
DATED              : November 15, 2016
INVENTOR(S)        : Akula et al.

It is certified that error appears in the above-identified patent and that said Letters Patent is hereby corrected as shown below:

In the Specification

In Column 7, Line 26, delete "application/j son" and insert -- application/json --, therefor.

Signed and Sealed this
Thirteenth Day of June, 2017

Joseph Matal
*Performing the Functions and Duties of the
Under Secretary of Commerce for Intellectual Property and
Director of the United States Patent and Trademark Office*